United States Patent [19]
Russo et al.

[11] Patent Number: 5,293,487
[45] Date of Patent: Mar. 8, 1994

[54] NETWORK ADAPTER WITH HIGH THROUGHPUT DATA TRANSFER CIRCUIT TO OPTIMIZE NETWORK DATA TRANSFERS, WITH HOST RECEIVE RING RESOURCE MONITORING AND REPORTING

[75] Inventors: Andrew P. Russo, Hyde Park; Satish L. Rege, Groton, both of Mass.; Edward T. Sullivan, Highland Village, Tex.; Mark F. Kempf, Stow, Mass.

[73] Assignee: Digital Equipment Corporation, Maynard, Mass.

[21] Appl. No.: 815,008

[22] Filed: Dec. 27, 1991

[51] Int. Cl.⁵ .............................................. G06F 13/00
[52] U.S. Cl. .................................... 395/200; 395/250; 395/275
[58] Field of Search ................. 364/DIG. 1, DIG. 2; 395/200, 275, 250; 370/60, 85.1, 85.2, 94.1

[56] References Cited

U.S. PATENT DOCUMENTS

| | | | |
|---|---|---|---|
| 4,449,122 | 5/1984 | Rubinson et al. | 364/200 |
| 4,692,918 | 9/1987 | Elliott et al. | 370/85 |
| 4,942,574 | 7/1990 | Zelle | 370/85.15 |
| 5,058,110 | 10/1991 | Beach et al. | 370/85.6 |
| 5,103,446 | 4/1992 | Fischer | 370/85.1 |
| 5,136,582 | 8/1992 | Firoozmand | 370/85.1 |

OTHER PUBLICATIONS

Satish Rege, *The Architecture and Implementation of a High-performance FDDI Adapter*, Digital Technical Journal, vol. 3, No. 3, Summer 1991, pp. 48–77.

*Primary Examiner*—Robert L. Richardson
*Attorney, Agent, or Firm*—A. Sidney Johnston; Albert P. Cefalo

[57] ABSTRACT

A network adapter with high throughput data transfer circuit to optimize network data transfers, with host receive ring resource monitoring and reporting is disclosed. Time critical network data is transferred between the network adapter and the host computer system by means of a high throughput data transfer circuit. The high throughput data transfer circuit is designed to provide throughput equal to the bandwidth of a high speed local area network such as the Fiber Distributed Data Interconnect. The high throughput data transfer circuit will inform the local intelligence of the network adapter if the network adapter has used up all host computer system memory allocated for storing data received from the network. Adapter management data is transferred between the network adapter and the host computer system local area network through a lower throughput data transfer circuit.

18 Claims, 10 Drawing Sheets

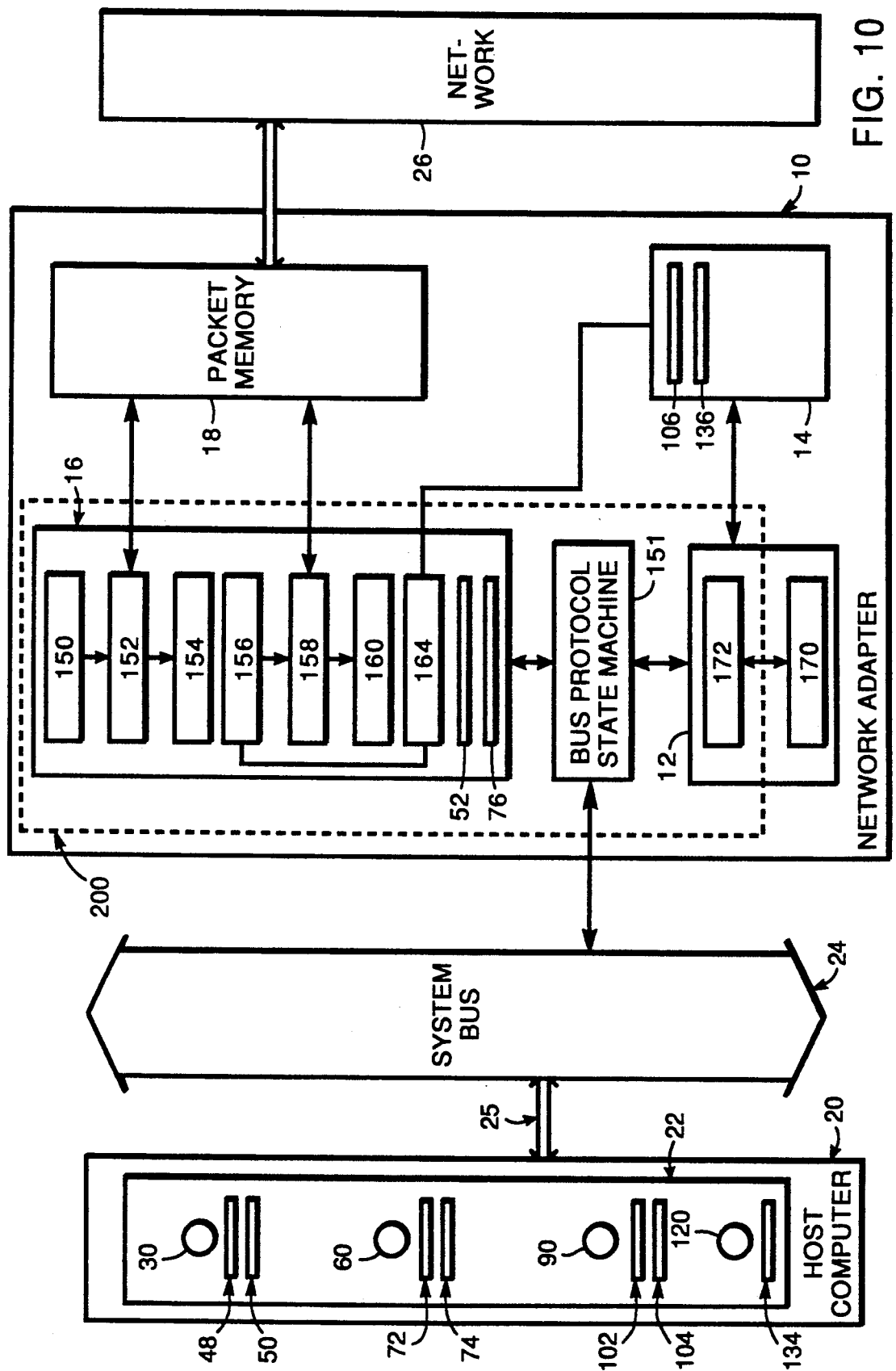

NETWORK ADAPTER WITH HIGH THROUGHPUT DATA TRANSFER CIRCUIT TO OPTIMIZE NETWORK DATA TRANSFERS, WITH HOST RECEIVE RING RESOURCE MONITORING AND REPORTING

FIELD OF THE INVENTION

This invention relates to communications between a network adapter and a host computer, and more particularly to multiple communications channels between a network adapter and a host computer for data transfers of different types.

BACKGROUND INFORMATION

Network Adapters

In computer networks a host computer system is normally connected to the network by a network adapter. In some designs, the network adapter is a board that plugs into the backplane bus of the host computer system. In other designs, the network adapter is built into the CPU motherboard.

Computer networks transfer data from one network node to another in the form of packets. For the purposes here, packets may include information for all layers of the ISO/OSI model at and above the data link layer. The network adapter transmits packets from the host computer system onto the network, and delivers packets from the network to the host computer system.

Potential Limit on Packet Throughput

A problem arises when the network adapter cannot deliver packets to the host computer system as quickly as the network can transfer them to the network adapter. In that case, when packets are sent to the network adapter at a sufficient rate for a sustained period, packet memory in the network adapter becomes full. Subsequent packets sent to the network adapter cannot be stored, and will be lost. Lost packets result in costly retransmissions, increased network latency, and virtual circuits being broken.

A related problem occurs when the network adapter cannot read packets from the host memory in the host computer system as quickly as the network can transfer them. In this case, the network adapter limits the rate at which the host computer system can transmit packets onto the network.

The network adapter provides many services to the host computer system. These services include packet transmission and packet reception, as well as network adapter initialization, network adapter diagnostics, and network management functions. The services that may limit packet throughput rates are packet transmission and packet reception. To avoid a limit on packet throughput between the host computer system and the network, those two services must move packets between the network adapter and the host computer system, at the same rate packets are transferred on the network itself.

Sufficiency of Host Memory Buffers for Receiving Packets

Another problem occurs when there are insufficient buffers in host memory allocated to store packets received from the network. When packets are received from the network by the network adapter, and are to be delivered to the host computer system, the packets are first received into the internal packet memory of the network adapter. The network adapter then moves the packets into receive buffers in the host memory allocated by the host computer system. If all receive buffers in host memory are full, the packets cannot be delivered to the host computer system. If this event occurs frequently, the host computer system's allocation of receive buffers in host memory is insufficient.

Need for New Network Adapter Designs

The higher bandwidth of the latest generation of networks makes solving these problems more difficult than in network adapters for previous generation networks. A typical fiber optic network, the ANSI defined Fiber Distributed Data Interconnect (FDDI), has a maximum bandwidth of approximately 100 megabits per second, and a packet carrying capacity of approximately 450,000 packets per second. This is approximately 10 times the bandwidth, and 30 times the packet carrying capacity of Ethernet, a typical previous generation network. Known designs for Ethernet network adapters were designed to meet the lower throughput requirements of that network, and are inadequate to meet the throughput requirements of networks such as FDDI.

It is therefore desirable to have a network adapter design with a data transfer circuit, providing packet throughput between the network adapter and the host computer system, equal to the packet throughput of a high speed network such as FDDI. It is further desirable to have a network adapter design include a means for informing the host computer system when all receive buffers in host memory are filled.

SUMMARY OF THE INVENTION

The invention solves the problem of providing packet throughput between a network adapter and a host computer system, equal to the packet throughput of a high speed network such as FDDI. In accordance with principles of the invention, there is provided a network adapter comprising two data transfer circuits for moving data to and from the memory in the host computer system. The first data transfer circuit provides higher throughput, equal to that of a high speed local area network such as the Fiber Distributed Data Interconnect (FDDI), for packets directly transferred to or from the communications medium. It is implemented entirely in hardware. The second data transfer circuit provides lower throughput, for data related to adapter management services performed internal to the adapter, which typically have lower throughput requirements. It is implemented partially in hardware, and partially in software or firmware running on a microprocessor based adapter management subsystem within the adapter.

The invention further provides means to inform the host computer system when all receive buffers in host memory are filled. This includes a detection means within the first data transfer circuit, detecting when all host memory allocated for the receipt of packets from the network has been filled. A reporting means, responsive to indication provided by the detection means, notifies the host computer system of this event via the lower throughput data transfer circuit.

BRIEF DESCRIPTION OF THE DRAWINGS

FIG. 10 is a logic diagram of the elements of FIG. 8, showing the preferred embodiment where all logical stat machines described in the previous drawings are implemented in a single application specific integrated circuit.

DETAILED DESCRIPTION

Figure 1:
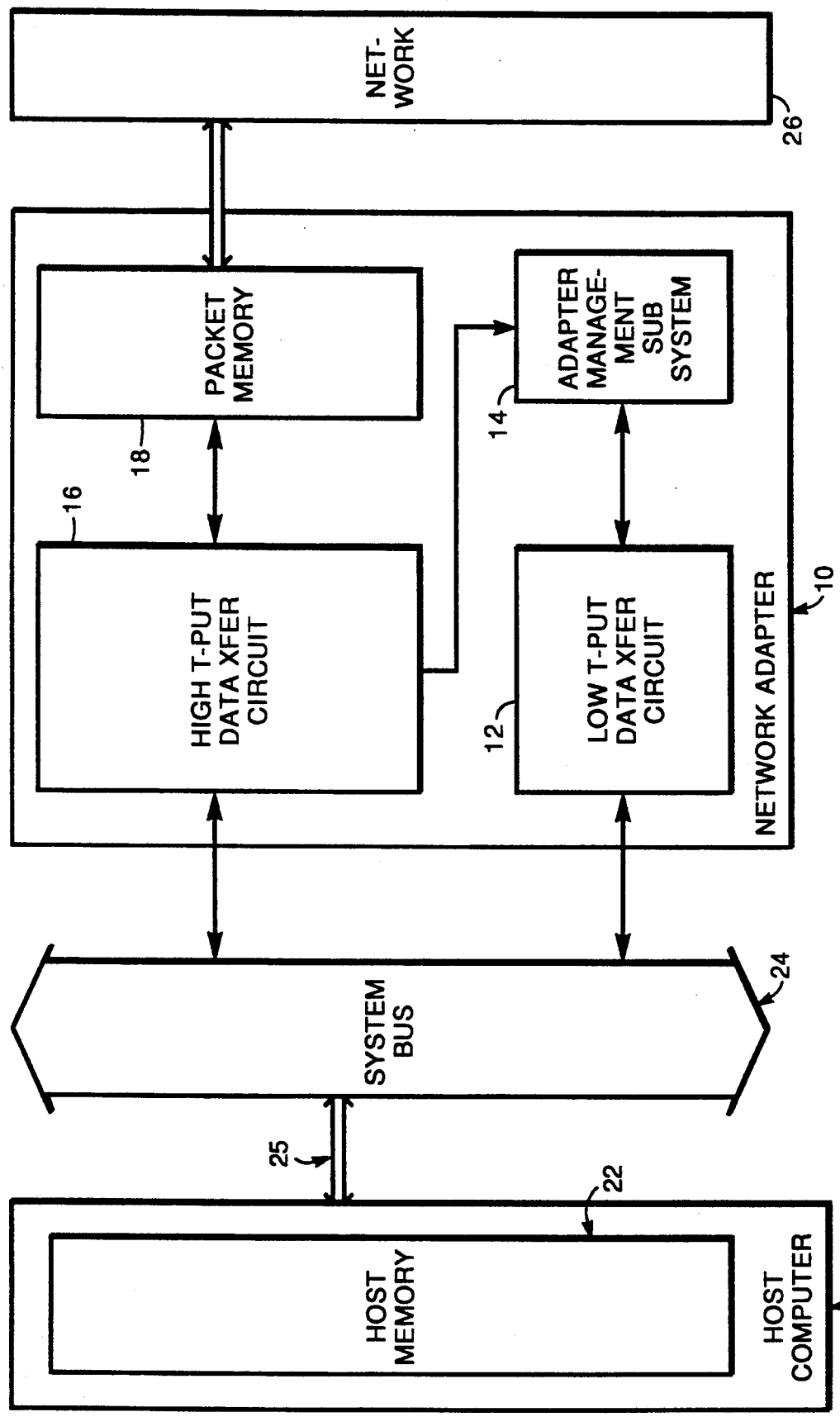
FIG. 1 is a logic diagram of a network adapter in accordance with the principles of the invention.

In FIG. 1, there is shown a network adapter 10 in accordance with principles of the invention, including a lower throughput data transfer circuit 12, an adapter management subsystem 14, a higher throughput data transfer circuit 16, and a packet memory 18. The lower throughput data transfer circuit 12 is coupled to a system bus 24, as well as to the adapter management subsystem 14. The higher throughput data transfer circuit 16 is coupled to the system bus 24, the packet memory 18, and the adapter management subsystem 14. External to the adapter, a host computer system 20 is shown with a host memory 22. The host memory 22 is coupled to the system bus 24 by path 25. A network 26 is shown coupled to the packet memory 18.

Now with respect to the operation of the elements in FIG. 1, packets received from the network 26 for delivery to the host computer system 20 are first stored in the packet memory 18. The packets are then transferred from the packet memory 18 into the host memory 22 by means of the higher throughput data transfer circuit 16.

If no space is available in the host memory 22 for packets received from the local area network 26, the higher throughput data transfer circuit 16 informs the adapter manager 14, which in turn notifies the host computer system 20 by means of the lower throughput data transfer circuit 12.

Packets from the host computer system 20, to be transmitted onto the network 26, are first read from the host memory 22 into the packet memory 18 by means of the higher throughput data transfer circuit 16. The packets are then transferred from the packet memory 18 onto the network 26.

Adapter management data is transferred between the adapter management subsystem 14 and the host computer system 20 by means of the lower throughput data transfer circuit 12. Adapter management data includes adapter management commands issued by the host computer system 20 to the network adapter 10 requesting adapter initialization, as well as diagnostic, and network management functions. Adapter management data also includes data transferred to the host computer system 20 in response to adapter management commands, and unsolicited data resulting from network events, and network adapter internal events. An example of unsolicited data is a notification message sent to the host computer system 20, from the network adapter 10, indicating the network has changed state, i.e. become available or unavailable.

Ring Data Structures in Host Memory

FIGS. 2, 3, 4, and 5 show ring data structures in host memory 22, used to pass data, including packets, between the host computer system 20 and the network adapter 10. The basic protocol of ring operation common to all of these rings is first described. A specific example of operation for each ring is provided below.

A ring data structure consists of a number of sequential ring entries. Each ring entry consists of various fields, including an ownership bit. The value of the ownership bit indicates whether the host computer system 20 or the network adapter 10 owns the ring entry. For example, if on a particular ring, when the ownership bit is 1, the host computer system 20 owns the ring entry, then when the ownership bit is 0, the network adapter 10 owns the ring entry. In the alternative, if when the ownership bit is 1 the network adapter 20 owns the ring entry, then the host computer system owns the entry when the ownership bit is 0.

Both the owner and the non-owner may read the ownership bit in a ring entry, but only the owner my write the ownership bit. Only the owner of a ring entry may read or write any of the other fields in the ring entry, or the buffer whose address is contained in the buffer address field of the ring entry.

Rings are circular data structures. In the following figures, the ring entries are processed from top to bottom, and the bottom ring entry is followed in sequence by the ring entry at the top of the ring.

Figure 2:
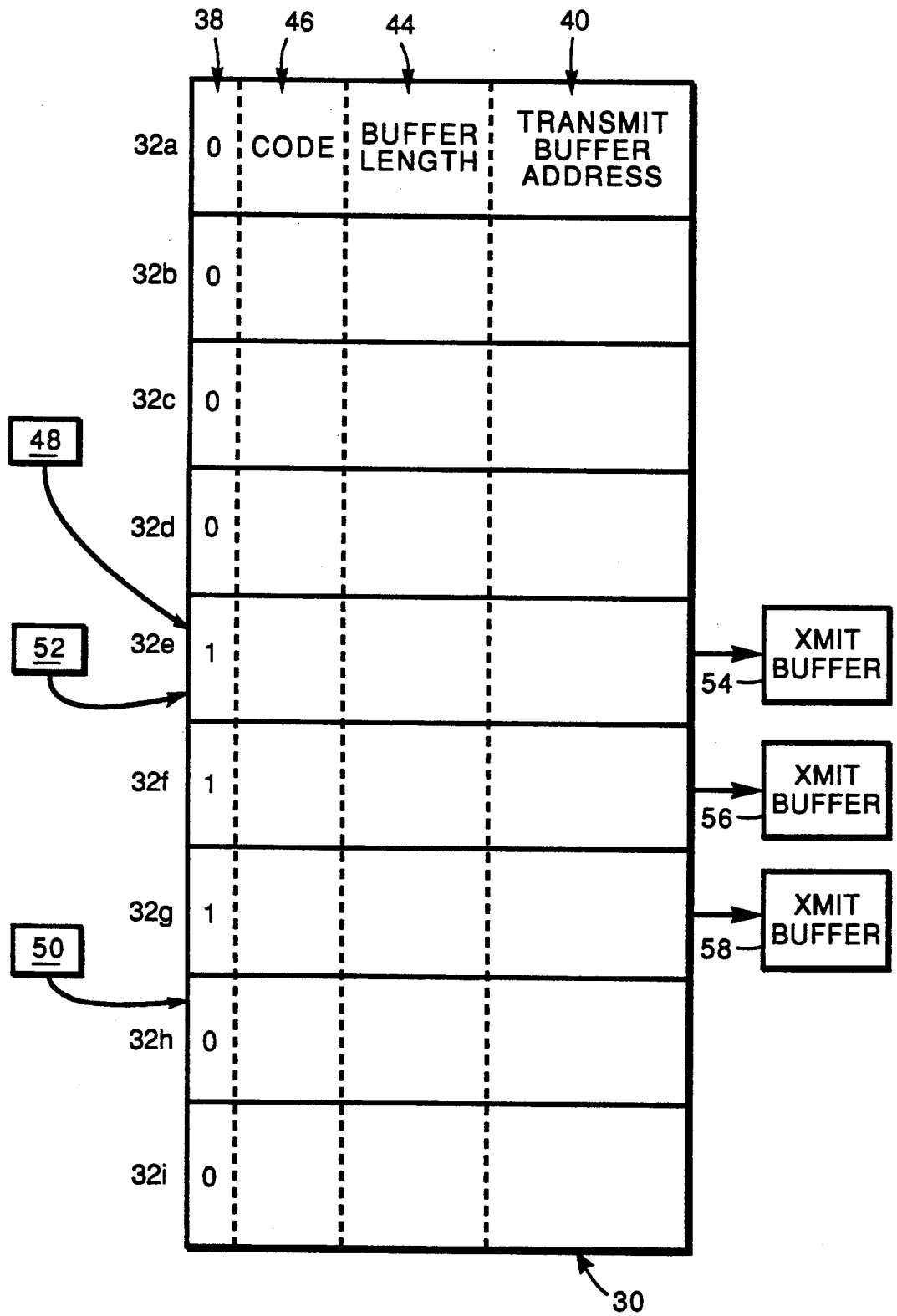
FIG. 2 is a diagram of a transmit ring data structure in host memory.

FIG. 2 shows the transmit ring 30, containing a fixed number of transmit ring entries 32a, 32b, ..., 32n (in this example, n=i). Each transmit ring entry 32a through 32n includes an ownership bit 38, a transmit buffer address field 40, a transmit buffer length field 44, and a transmit completion code 46. A transmit free pointer 48, and a transmit fill pointer 50, exist in the host computer system 20. A next transmit pointer 52, exists in the network adapter 10.

For purposes of example, the transmit free pointer 48 and the transmit fill pointer 50, in the host computer system 20, point to transmit ring entry 32e and transmit ring entry 32h, respectively. The transmit next pointer 52 in the network adapter 10 points to transmit ring entry 32e. Transmit ring entries with ownership bit equal to 1 (32e, 32f, and 32g), are owned by the network adapter 10. The transmit buffer address fields of these three entries contain the addresses of transmit buffers 54, 56, and 58 respectively. These transmit buffers each contain a packet to be sent by the adapter 10 onto the network 26. Those ring entries with ownership bit equal to 0 (32a, 32b, 32c, 32d, 32h, and 32i), are owned by the host computer system.

Prior to when this example begins, the host computer system 20 passed the ownership of three transmit ring entries, 32e, 32f, and 32g, to the network adapter 10. The events occurring as the network adapter 10 processes these entries are as follows. The higher throughput data transfer circuit 16 reads the ownership bit 38 of the transmit ring entry pointed to by the transmit next pointer 52 (transmit entry 32e), and determines the network adapter 10 owns the entry. Using the transmit buffer address field 40 and transmit buffer length field 44 to locate the transmit buffer 54 in host memory 22, the higher throughput data transfer circuit 16 moves the data from the transmit buffer 54 into the packet memory 18, for subsequent transmission onto the network 26. This movement of data requires multiple accesses to the system bus 24 by both the host computer system 20 and the network adapter 10. Upon completion of the data move, the higher throughput data transfer circuit 16 writes the transmit completion code 46 in the transmit ring entry 32e, changes the ownership of the transmit ring entry to 0, and advances the transmit next pointer 52 to point to the next transmit ring entry in sequence (32f). Transmit ring entries 32f and 32g are then processed similarly. After transmit ring entries 32f and 32g have been processed, the next transmit pointer 52 points to transmit ring entry 32h.

To transmit another packet, the host computer system 20 uses the transmit ring entry pointed to by the transmit fill pointer 50 (ring entry 32h). The host computer system 20 first writes the transmit buffer address field 40, and the transmit buffer length field 44 of the transmit entry 32h, with the address and length of the transmit buffer containing the packet to be transmitted. The host computer system 20 then changes the ownership bit 38 of transmit ring entry 32h to 1. The higher throughput data transfer circuit 16 reads the ownership bit 38 of the transmit ring entry 32h, detects that transmit ring entry 32h is owned by the network adapter 10, processes it as described above, and sets the next transmit pointer 52 to point to transmit ring entry 32i. This process continues, with the host computer system 20 providing transmit buffers containing packets to the network adapter 10, and the network adapter 10 moving the transmit buffers into packet memory 18, for transmission on the network 26.

Figure 3:
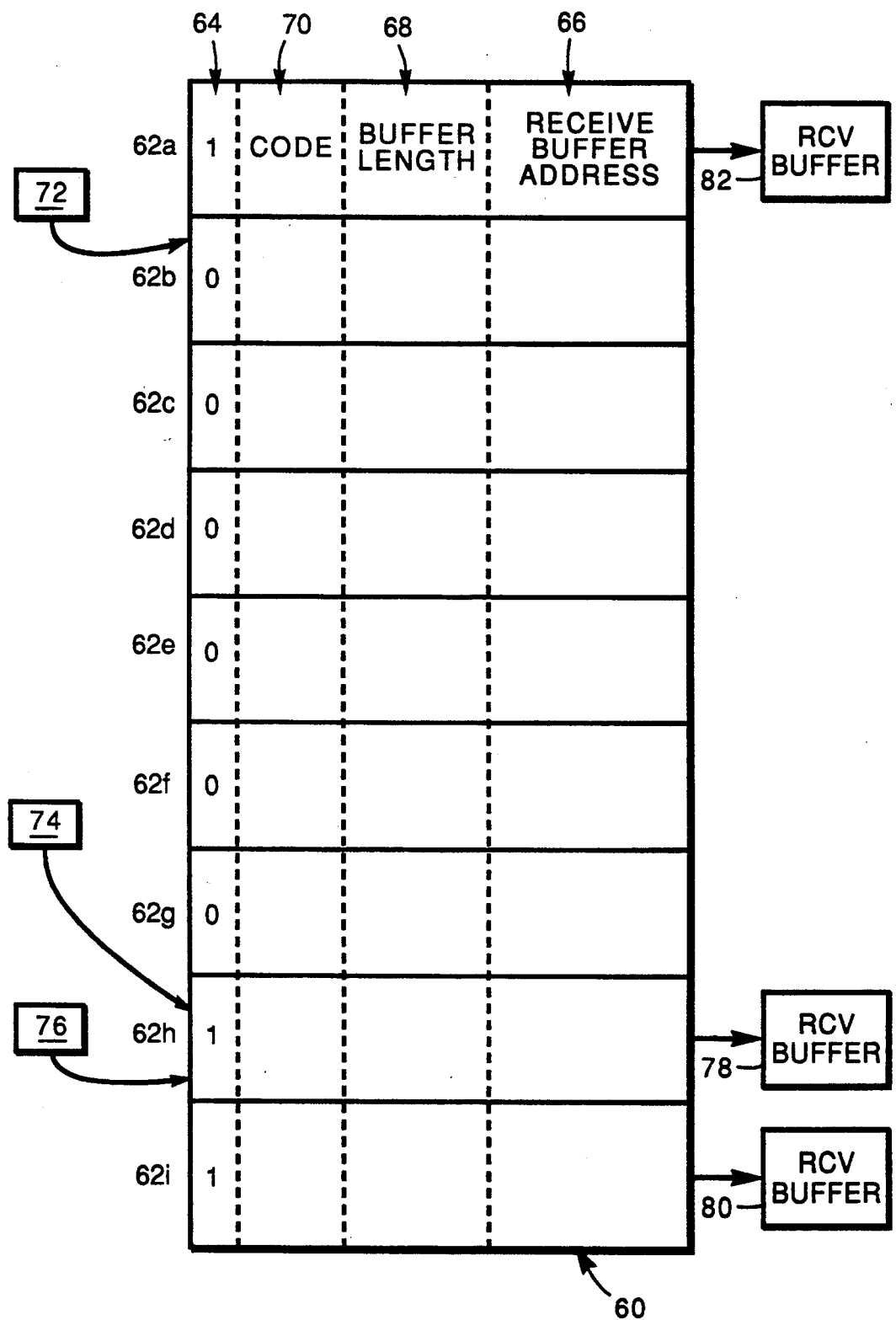
FIG. 3 is a diagram of a receive ring data structure in host memory.

FIG. 3 shows the receive ring 60, a data structure in the host memory 22. The receive ring 60 contains a fixed number of receive ring entries 62a, 62b, . . . , 62n (in this example, n=i). Each receive ring entry 62a through 62n includes an ownership bit 64, a receive buffer address field 66, a receive buffer length field 68, and a receive completion code field 70. A receive free pointer 72, and a receive fill pointer 74, exist in the host computer system 20. A next receive pointer 76, exists in the higher throughput data transfer circuit 16.

For purposes of example, in FIG. 3, the receive free pointer 72 and the receive filled pointer 74, in the host computer system 20, point to receive ring entry 62b and receive ring entry 62h, respectively. The next receive pointer 76 in the higher throughput data transfer circuit 16 points to receive ring entry 62h. Receive ring entries with ownership bit equal to 1 (62h, 62i, and 62a), are owned by the network adapter 10. The receive buffer address fields of these three entries contain the addresses of receive buffers 78, 80, and 82 respectively. Those receive ring entries with ownership bit equal to 0 (62b, 62c, 62d, 62e, 62f, and 62g), are owned by the host computer system 20.

Prior to when the example begins, the host computer system 20 has passed the ownership of three receive ring entries, 62h, 62i, and 62a, to the network adapter 10. The events occurring as the network adapter 10 processes these entries are as follows. The higher throughput data transfer circuit 16 reads the ownership bit 64 in the receive ring entry pointed to by the next receive pointer 76 (receive entry 62h), and determines that the network adapter 10 owns the entry. Using the receive buffer address field 66 and receive buffer length field 68 to locate the receive buffer 78 in host memory 22, the higher throughput data transfer circuit 16 moves a packet from packet memory 18 into the receive buffer 78. This movement of data requires multiple accesses to the system bus 24 by both the host computer system 20 and the network adapter 10. When the data move completes, the higher throughput data transfer circuit 16 writes the receive completion code 70, and changes the ownership of the receive ring entry 62h to 0. It then advances the next receive pointer 76 to point to the next receive ring entry in sequence (62i). Receive ring entries 62i and 62a are then processed similarly. When processing of receive ring entries 62i and 62a is completed, the next receive pointer 76 points to receive entry 62b.

To provide another receive buffer to the network adapter 10, the host computer system 20 uses the receive ring entry pointed to by the receive free pointer 72 (ring entry 62b). The host computer system 20 first writes the receive buffer address field 66 and the receive buffer length field 68 of the receive entry 62b with the address and length of a new receive buffer. It then changes the ownership of receive ring entry 62b to 1. The higher throughput data transfer circuit 16 reads the ownership bit 64 of the receive ring entry 62b, determines that the network adapter 10 owns it, processes it as described above, and sets the next receive pointer to point to receive ring entry 62c. This process continues, with the host computer system 20 providing new receive buffers to the network adapter 10, and the higher throughput data transfer circuit 16 moving data from the packet buffer 18 into the receive buffers.

Figure 4:
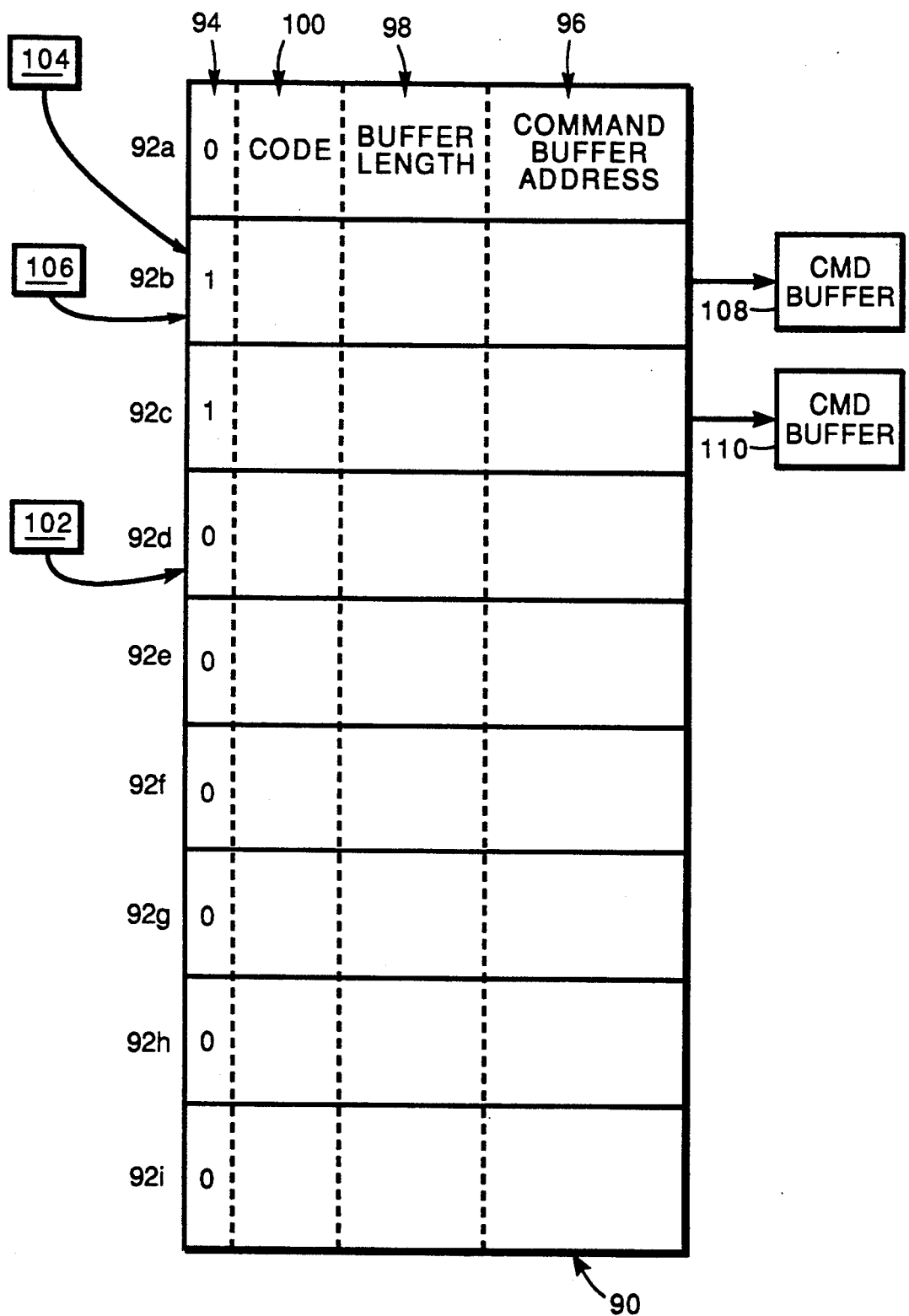
FIG. 4 is diagram of a command ring data structure in host memory.

FIG. 4 shows the command ring 90, a data structure in the host memory 22. The command ring 90 contains a fixed number of command ring entries 92a, 92b, . . . , 92n (in this example, n=i). Each command ring entry 92a through 92n includes an ownership bit 94, a command buffer address field 96, a command buffer length field 98, and a command completion code field 100. A command fill pointer 102, and a command free pointer 104, exist in the host computer system 20. A next command pointer 106, exists in the network adapter 10.

For purposes of example, in FIG. 4, the command fill pointer 102 and the command free pointer 104, point to command ring entry 92d and command ring entry 92b, respectively. The next command pointer 106 points to transmit ring entry 92b. Command ring entries with ownership bit equal to 1 (92b and 92c), are owned by the network adapter 10. The command buffer address fields of these two entries contain the addresses of command buffers 108 and 110, respectively. Those command ring entries with ownership bit equal to 0 (92a, 92d, 62e, 62f, 62g, 92h, and 92i), are owned by the host computer system 20.

Prior to when the example begins, the host computer system 20 passed the ownership of two command ring entries, 92b and 92c, to the network adapter 10. The events occurring as the network adapter 10 processes these entries are as follows. The adapter management subsystem 14 uses the lower throughput data transfer circuit 12 to read the ownership bit 94 of the command ring entry pointed to by the next command pointer 106 (command ring entry 92b), and determines the network adapter 10 owns the entry. Using the command buffer address field 96 and command buffer length field 98 to locate the command buffer 108 in host memory 22, the adapter management subsystem 14 then uses the lower throughput data transfer circuit 12 to read the data in the command buffer 108. The adapter management subsystem 14 then processes the command data. After processing the command data, the adapter management subsystem requests the lower throughput data transfer circuit 12 to write the command results to the command buffer 108, write the command completion code 100 in the command ring entry 92b, and write the ownership bit 94 of the command ring entry 92b to 0. The adapter management subsystem 12 then advances the next command pointer 106 to point to the next command ring entry in sequence (92c). Command ring entry 92c is then processed similarly. After command entry 92c is processed, the next command pointer points to command entry 92d.

To pass another command buffer to the network adapter 10, the host computer system 20 uses the command ring entry pointed to by the command fill pointer 102 (command ring entry 92d). The host computer system 20 first writes the command buffer address field 96, and the command buffer length field 98, of the command entry 92d, with the address and length of the new command buffer. It then changes the ownership bit 94 of command ring entry 92d to 1. The adapter management subsystem 14 then uses the lower throughput data transfer circuit 12 to read the ownership bit 94 of the command ring entry 92d, and detects that the network adapter 10 owns the command ring entry 92d. The new command buffer is then processed as described above. This process continues, with the host computer system 20 providing new command buffers to the network adapter 10, the adapter management subsystem 14 using the lower throughput data transfer circuit 12 to read the command entries and the command buffers, the adapter management subsystem 14 then processing the command buffers, and finally using the lower throughput data transfer circuit 12 to write back the command results, and return the ownership of the command ring entry and command buffer to the host computer system 20.

Figure 5:
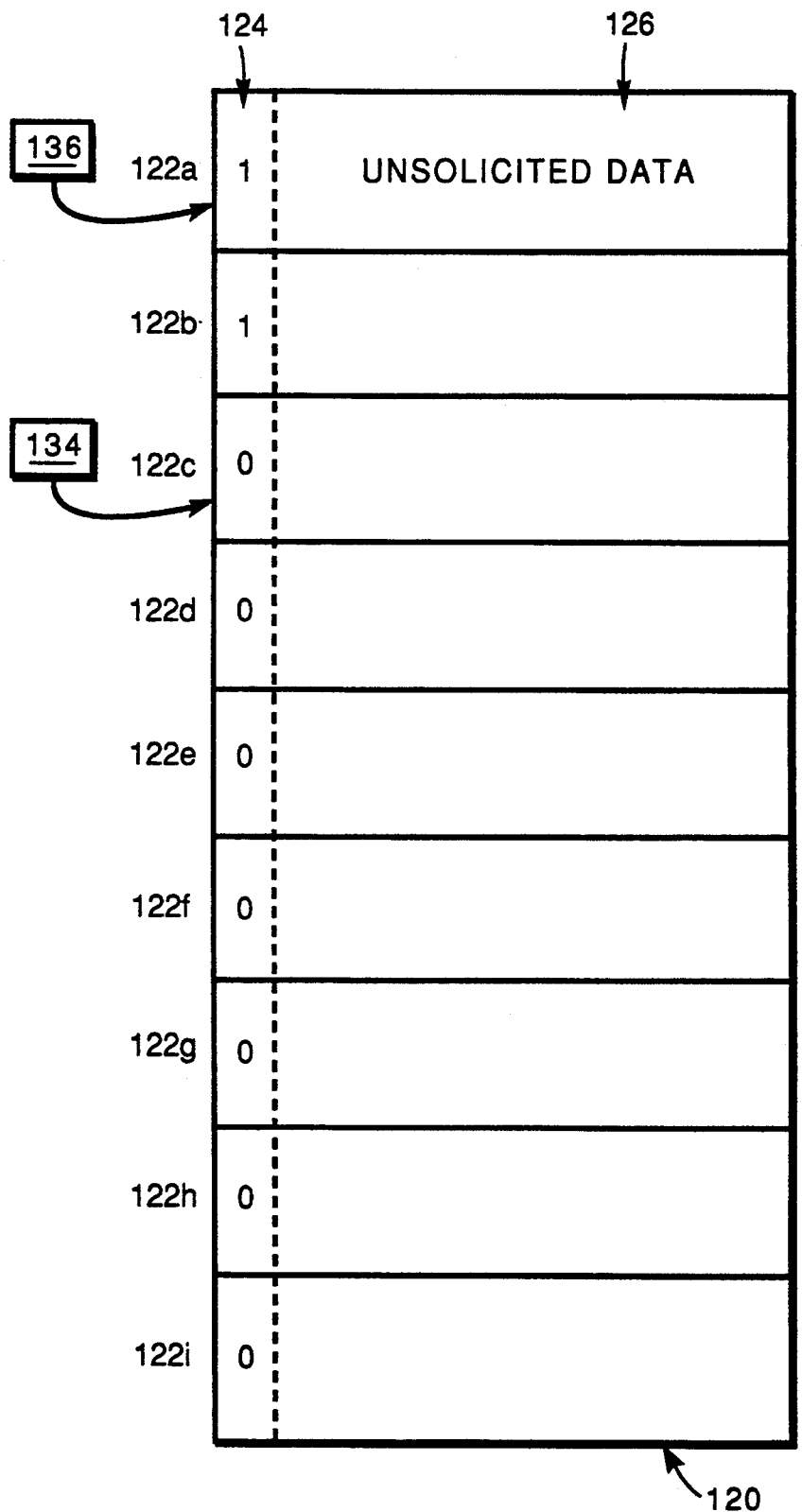
FIG. 5 is a diagram of an unsolicited ring data structure in host memory.

FIG. 5 shows the unsolicited ring 120, a data structure in the host memory 22. The unsolicited ring 120 contains a fixed number of unsolicited ring entries 122a, 122b, ..., 122n (in this example, n=i). Each unsolicited ring entry 122a through 122n includes an ownership bit 124, and an unsolicited data field 126. An unsolicited fill pointer 134 exists in the host computer system 20. A next unsolicited pointer 136, exists in the network adapter 10.

For purposes of example, in FIG. 5, the unsolicited fill pointer 134 in the host computer system 20 points to unsolicited ring entry 122a. The unsolicited next pointer 136 in the network adapter 10 points to unsolicited ring entry 122a. Unsolicited ring entries with ownership bit equal to 1 (122a and 122b), are owned by the network adapter 10. Those unsolicited ring entries with ownership bit equal to 0 (122c, 122d, 122e, 122f, 122g, 122h, and 122i), are owned by the host computer system 20.

Prior to when the example begins, the network adapter has passed the ownership of seven unsolicited ring entries, 122c, 122d, 122e, 122f, 122g, 122h, and 122i, to the host computer system 20. The events occurring as the network adapter 10 processes the two remaining ring entries, 122a and 122b, are as follows. The adapter management subsystem 12 uses the lower throughput data transfer circuit 12 to read the ownership bit 124 of the unsolicited ring entry pointed to by the next unsolicited pointer 136 (unsolicited ring entry 122a), and determines that the network adapter 10 owns the entry. On request from the adapter management subsystem 14, the lower throughput data transfer circuit 12 moves unsolicited data from the adapter management subsystem 14 into the unsolicited data field 126 of the unsolicited ring entry 122a. This data move is across the system bus 24 from the network adapter 10 to the host memory 22. When the data move completes, the adapter management subsystem 14 uses the lower throughput data transfer circuit 12 to change the ownership bit 124 of the unsolicited ring entry 122a to 0. The adapter management subsystem 14 then advances the next unsolicited ring entry pointer 136 to point to the next unsolicited ring entry in sequence (122b). Unsolicited ring entry 122b is then processed similarly. When processing of unsolicited ring entry 122b completes, the next unsolicited pointer points to unsolicited ring entry 122c.

To process an unsolicited ring entry provided by the network adapter 10, the host computer system 20 uses the unsolicited ring entry pointed to by the unsolicited ring fill pointer 134 (unsolicited ring entry 122c). The host computer system 20 first reads the unsolicited data field 126 in unsolicited ring entry 122c, and then changes the ownership bit 124 of unsolicited ring entry 122c to 1. The adapter management subsystem 14 then uses the lower throughput data transfer circuit 12 to read the ownership bit 124 of the unsolicited ring entry 122c, and detects that the network adapter 10 owns it. On request from the adapter management subsystem 14, the lower throughput data transfer circuit uses the entry to pass unsolicited data from the adapter management subsystem 14 to the host computer system 20. This process continues, with the host computer system 20 processing new unsolicited ring entries as they are provided by the network adapter 10.

Figure 6:
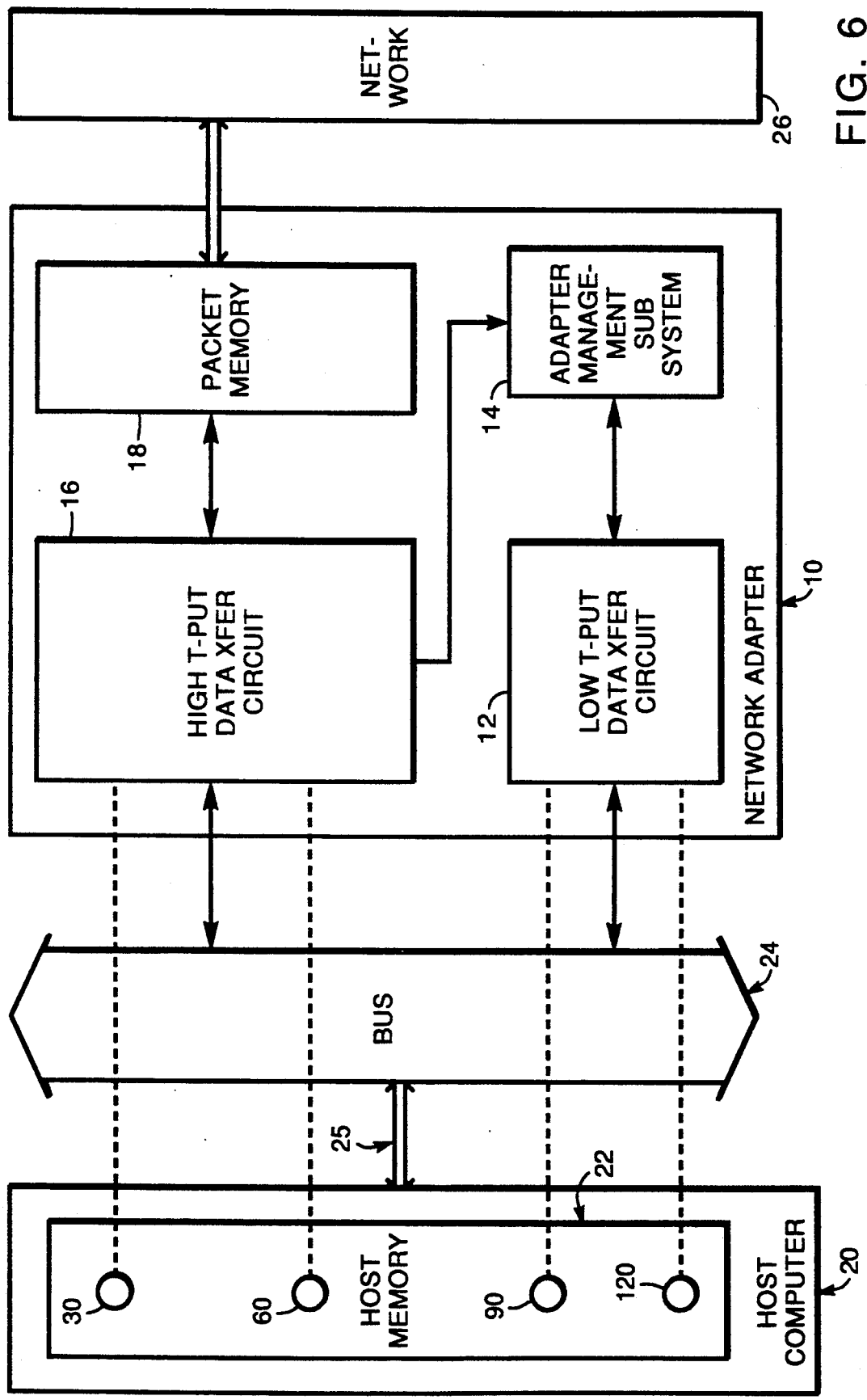
FIG. 6 is a logic diagram associating the higher speed data transfer circuit with the transmit and receive rings, and the lower speed data transfer circuit with the command and unsolicited rings.

FIG. 6 shows the elements of FIG. 1, as well as the transmit ring 30, the receive ring 60, the command ring 90, and the unsolicited ring 120. The higher throughput data transfer circuit 16 is logically coupled (shown with dotted lines) to the transmit ring 30 and receive ring 60. The lower throughput data transfer circuit 12 is logically coupled (again shown with dotted lines) to the command ring 90 and the unsolicited ring 120.

Operation of the elements shown in FIG. 6 is now described. The network adapter 10 stores packets received from the network 26 in packet memory 18. The higher throughput data transfer circuit 16 then moves the packets into memory buffers in host memory 22 whose addresses are contained in receive ring entries in the receive ring 60.

To transmit packets onto the network 26, the host computer system 20 writes the addresses of transmit buffers containing packets to be transmitted onto the network 26 in transmit ring entries in the transmit ring 30. The higher throughput data transfer circuit 16 then moves the packets into the packet memory 18, from which they are subsequently transmitted onto the network 26.

To issue commands to the network adapter 10, the host computer system 20 writes the addresses of command buffers containing command data to command ring entries on the command ring 60. The lower throughput data transfer circuit 12 reads the command data into the adapter management subsystem 14, where the commands are processed. The lower throughput data transfer circuit 12 writes back any command results into the command buffers.

The adapter management subsystem 14 passes unsolicited data to the host computer system 20 using the lower throughput data transfer circuit 12 to write to unsolicited entries on the unsolicited ring 120.

Figure 7:
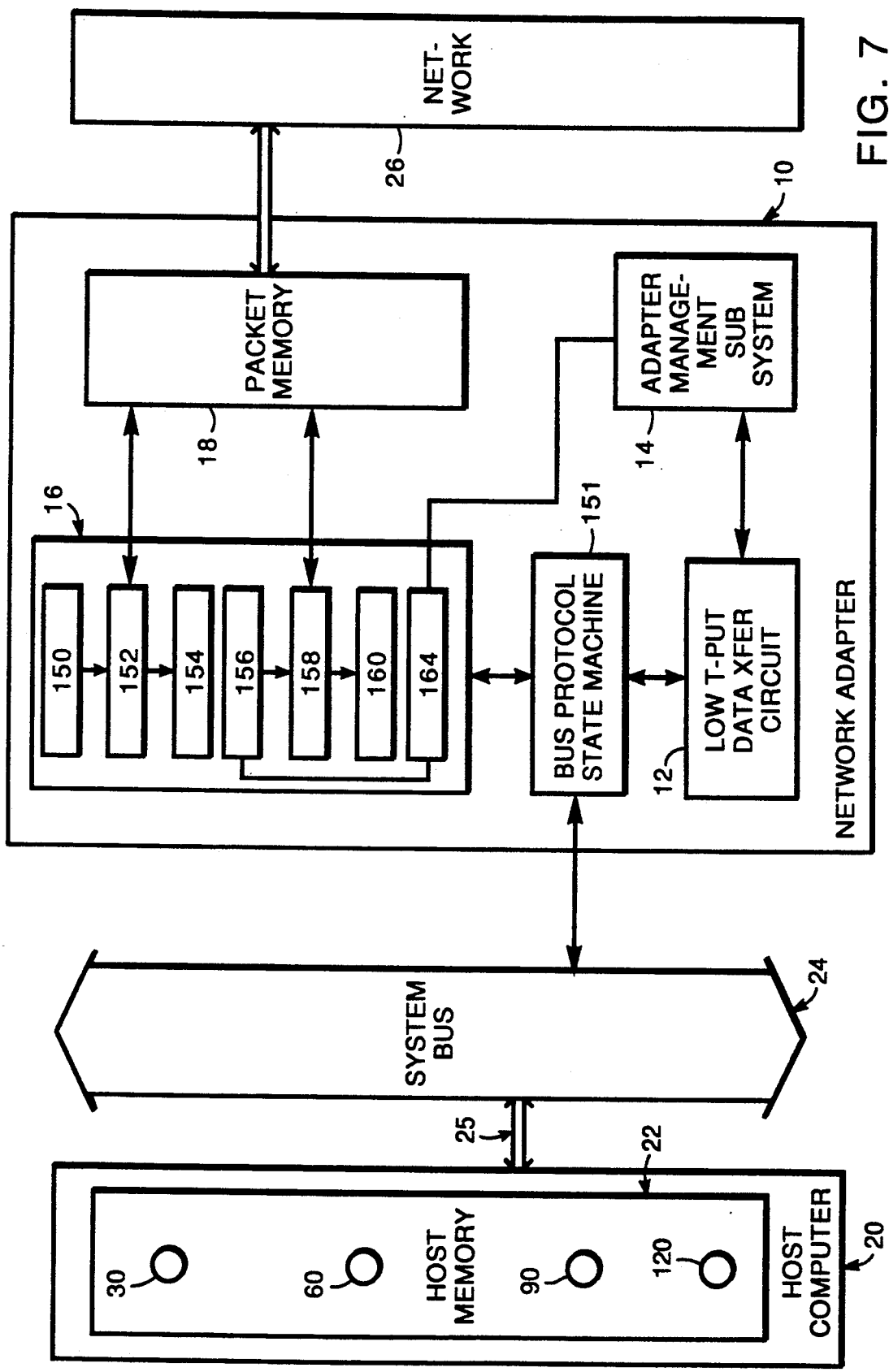
FIG. 7 is a logic diagram of the elements in FIG. 6, showing the logical state machines within the higher throughput data transfer circuit.
Figure 8:
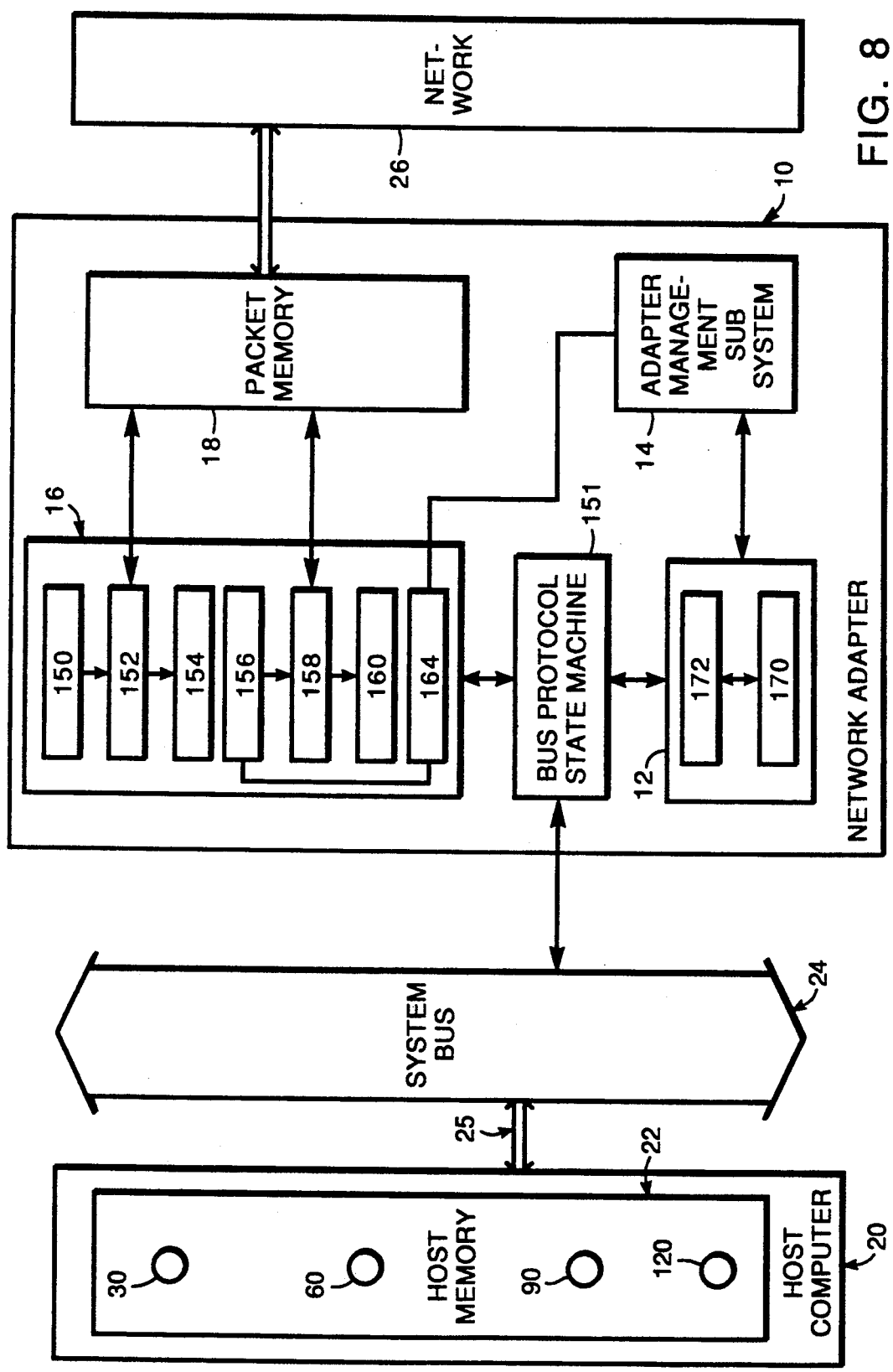
FIG. 8 is a logic diagram of the elements in FIG. 7, showing the logical state machines and processes within the lower throughput data transfer circuit.

FIGS. 7 and 8 show the elements of FIG. 6, with the higher throughput data transfer circuit 16, and the lower throughput data transfer circuit 12 expanded to show their logical state machines, and processes. The logical state machines in FIGS. 7 and 8 are clocked logic circuits having a plurality of inputs and a plurality of outputs, where an output is unique for each set of inputs and the present state. The next state of a logical state machine is determined by the present state and the inputs. In a preferred embodiment of the invention, all the logical state machines shown in FIGS. 7 and 8 are implemented in a single Application Specific Integrated Circuit (ASIC). For the purposes here, a process is similar to a logical state machine, except that it is implemented in software or firmware running on a microprocessor within the network adapter 10.

First, referring to FIG. 7, those logical state machines within the higher throughput data transfer circuit 16, related to moving data from the host memory 22 into the packet memory 18, are described. A transmit ring entry pre-processing state machine 150 is coupled to a system bus protocol state machine 151, and a transmit buffer data mover 152. The transmit buffer data mover 152 is coupled to the system bus protocol state machine 151, the packet memory 18, and a transmit ring entry post-processing state machine 154. The transmit ring entry post-processing state machine 154 is coupled to the system bus protocol state machine 151.

Now with reference to FIG. 7, logical state machines within the higher throughput data transfer circuit 16, related to moving data from the packet memory 18 into the host memory 22, are described. A receive ring entry pre-processing state machine 156 is coupled to a receive buffer data mover state machine 158, and a receive buffer unavailable state machine 164. The receive buffer unavailable state machine 164 is coupled to the adapter management subsystem 14. The receive buffer data mover state machine 158 is coupled to a system bus protocol state machine 151, the packet memory 18, and a receive ring entry post processing state machine 160.

Now with reference to FIG. 7, the operation of the higher throughput data transfer circuit 16 when transferring data from host memory 22 into the packet memory 18 is described. When the transmit ring entry pre-processing state machine 150 finds there is a transmit ring entry owned by the network adapter 10, it passes the address and length of the transmit buffer associated with that transmit ring entry to the transmit buffer data mover 152. The transmit buffer data mover 152 then moves the data from the transmit buffer into the packet memory 18, and passes completion status of the data move to the transmit ring entry post-processing state machine 154. The transmit ring entry post-processing state machine 154 then writes the completion status to the transmit ring entry associated with the transmit buffer, and changes ownership of the transmit ring entry to the host computer system.

Now with reference to FIG. 7, the operation of the higher throughput data transfer circuit 16 when transferring data from the packet memory 18 into the host memory 22 is described. When the receive ring entry pre-processing state machine 156 detects there is a receive ring entry that is owned by the network adapter 10, it passes the receive buffer address and length from that receive ring entry to the receive buffer data mover 158. The receive buffer data mover 158 then moves any data in the packet memory 18 for the host computer system 20 into the receive buffer, and passes completion status to the receive ring entry post process state machine 160. The receive ring entry post process state machine 160 will then write the completion status to the receive ring entry associated with the receive buffer, and changes the ownership bit in the receive ring entry so that the receive ring entry is owned by the host computer system.

To avoid loss of a packet(s) received by the network adapter 10 for delivery to the host computer system 20, receive buffers in host memory 22 must be available to copy the packet(s) into. Accordingly, there must always be at least one ring entry in the receive ring 60 owned by the network adapter 10. If the receive ring entry pre-processing state machine 156 does not find a ring entry in the receive ring 60 that is owned by the adapter, it notifies the receive buffer unavailable state machine 174. The receive buffer unavailable state machine 174 notifies the adapter management subsystem 14. The adapter management subsystem 14 then uses the lower throughput data transfer circuit 12, to notify the host computer system 20 of this event by means of the lower throughput data transfer circuit 12 and the unsolicited ring 120. The host computer system 20 may then increase the number of receive entries owned by the network adapter 10 on the receive ring 60.

Now with reference to FIG. 8, the logical state machines and processes in the lower throughput data transfer circuit 12 are described. A data mover interface process 170, coupled to the adapter management subsystem 14, is also coupled to an adapter manager data mover state machine 172. The adapter manager data mover state machine 172 is coupled to the system bus protocol state machine 151.

Now with reference to FIG. 8, the operation of the lower throughput data transfer circuit 12 is described. The adapter management subsystem 14 uses the lower throughput data transfer circuit 12 to access the command ring 90 and associated command buffers, and the unsolicited ring 120. Both of these rings and the associated buffers are located in the host memory 22.

For a read of data from host memory 22, the adapter management subsystem 14 first passes the address and length of the read to the data mover interface process 170. The data mover interface process 170 then requests the adapter manager data mover state machine 172 to do the read. The adapter manager data mover state machine 172 then accesses the host memory 22 using the system bus protocol state machine 151. When the read completes, the data mover interface process 170 passes back the data and the read completion status from the adapter manager data mover state machine 172 to the adapter management subsystem 14. For a write to host memory, the adapter management subsystem 14 first passes the data to be written, and the address in host memory 22 at which to write the data, to the data mover interface process 170. The data mover interface process 170 then requests the adapter manager data mover state machine 172 to perform the write. The adapter manager data mover 172 in turn uses the system bus protocol state machine 151 to perform the data write to host memory 22. When the write completes, the adapter manager data mover state machine 172 returns the completion status from the write request to the data mover interface process 170. The data mover interface process 170 in turn returns the completion status of write to the adapter management subsystem 14.

Figure 9:
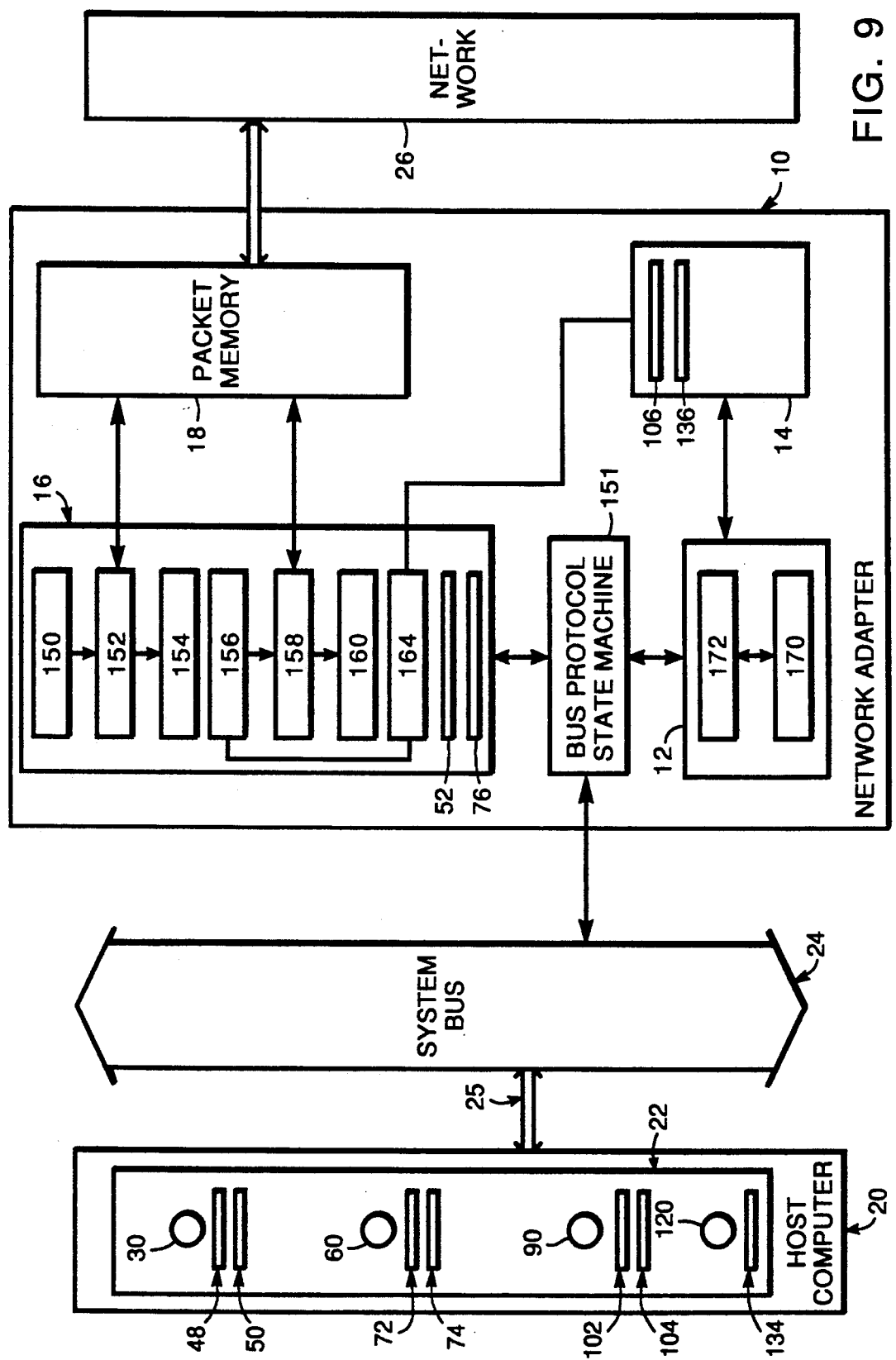
FIG. 9 is a logic diagram of the elements in FIG. 8, further showing the locations of the pointers referenced in FIGS. 2 through 5.

FIG. 9 shows the elements in FIG. 8, also showing the pointers to ring entries in the shared ring data structures in the host memory 22 described in FIGS. 2 through 5. The transmit free pointer 48, the transmit fill pointer 50, the receive free pointer 72, the receive fill pointer 74, the command fill pointer 102, the command free pointer 104, and the unsolicited fill pointer 134 are contained in the host memory 22. The next transmit pointer 52 and the next receive pointer 76 are contained in the higher throughput data transfer circuit 16. In a preferred embodiment of the invention, the next transmit pointer 52 and the next receive pointer 76 are implemented as registers contained in the same ASIC as the logical state machines described in FIGS. 7 and 8. The next command pointer 106 and the next unsolicited pointer 136 are contained in the adapter manager 14.

During operation, the transmit free pointer 48, the transmit fill pointer 50, and the next transmit pointer 52 contain addresses of transmit entries in the transmit ring 30 in the host memory 22. Their operation is further shown and described in FIG. 2. The receive free pointer 72, the receive fill pointer 74, and the next receive pointer 76 contain addesses of receive entries in the receive ring 60 in the host memory 22. Their operation is further shown and described in FIG. 3. The command fill pointer 102, the command free pointer 104, and the next command pointer 106 contain addresses of receive entries in the command ring 90 in the host memory 22. Their operation is further shown and described in FIG. 4. The unsolicited fill pointer 134 and next unsolicited pointer 136 contain addresses of ring entries contained in the unsolicited ring 120 in the host memory 22. Their operation is further show and described in FIG. 5.

FIG. 10 shows the elements of FIG. 9 in a preferred embodiment where all of the logical state machines described in the previous drawings are implemented in a single application specific integrated circuit (ASIC) 200, shown as a dotted line. The operation of the logical state machines within the ASIC 200 is described in the previous drawings.

What is claimed is:

1. A network adapter for data transfer between a host computer system and a computer network, said network adapter coupled with both said host computer system and said computer network, said host computer system having a host memory, and said host memory containing one or more adapter manager command buffers, comprising:

a packet memory, containing one or more data packets received by said network adapter from said computer network;

a higher throughput data transfer circuit, coupled with said packet memory, for transferring said one or more data packets received from said computer network, from said packet memory to said host memory;

an adapter management subsystem, responsive to said adapter management command buffers in said host memory, for processing said adapter management command buffers, and for generating command responses in response to said adapter management command buffers; and a lower throughput data transfer circuit, coupled with said adapter management subsystem, and responsive to said adapter management subsystem, for transferring said adapter management command buffers from said host memory to said adapter management subsystem and for transferring said command responses from said adapter management subsystem to said host memory.

2. The network adapter as in claim 1, wherein said higher throughput data transfer circuit further comprises:

a first means for determining whether a host receive buffer in said host memory is available for storage of packet data from said packet memory;

a second means, responsive to said first means, for notifying said adapter management subsystem when said host receive buffer is not available.

3. The network adapter as in claim 2 wherein said higher throughput data transfer circuit further comprises:

a first state machine means, responsive to the contents of a next transmit pointer in said higher throughput data transfer circuit, for reading a ring entry contained in a transmit ring located in said host memory pointed to by said next transmit pointer, said entry containing an ownership bit, a buffer address field, a buffer length field, and a transmit completion code field, and outputting the buffer length and buffer address from said buffer length field and said buffer address field;

a second state machine means for receiving said buffer address and said buffer length output from said first state machine, moving buffer data indicated by said buffer address and said buffer length into said packet memory, and outputing a transmit completion code;

a third state machine means for receiving said transmit completion code output from said second state machine, writing said transmit completion code to said transmit ring entry transmit completion code field, and setting the value of said next transmit pointer to the next sequential ring entry in said transmit ring;

a fourth state machine means responsive to the contents of a next receive pointer in said higher throughput data transfer circuit, for reading a ring entry contained in a receive ring located in said host memory pointed to by said next receive pointer, said entry containing an ownership bit, a buffer address field, a buffer length field, and a receive completion code field, and outputting the buffer length and buffer address from said buffer length field and said buffer address field;

a fifth state machine means for receiving said buffer address and said buffer length output from said fourth state machine, and moving packet data from said packet memory into said host memory at memory locations indicated by said buffer address and said buffer length, and outputing a receive completion code; and a sixth state machine means for receiving said receive completion code output from said fifth state machine, writing said receive completion code to said receive ring entry receive completion code field, and setting the value of said next receive pointer to the next sequential ring entry in said receive ring.

4. The network adapter as in claim 3, wherein said lower speed data transfer circuit further comprises:

a first state machine means, responsive to address and length inputs, for reading and writing said host memory, in the case of reading said host memory outputing the data read, and in the case of writing said host memory outputting a completion status of the write operation;

a second process means, responsive to said adapter management subsystem, for providing address and length inputs to said first means, receiving said data or completion code outputs from said first means, and outputting said data or completion code to said adapter management subsystem.

5. The network adapter as in claim 4, wherein all said state machine means are implemented in a single application specific integrated circuit (ASIC).

6. The network adapter as in claim 5, wherein said higher speed data transfer circuit further comprises:

a next transmit pointer containing the address of the next transmit ring entry to be processed; and a next receive pointer containing the address of the next receive ring entry to be processed.

7. The network adapter as in claim 6, wherein said adapter management subsystem further comprises:

a next command pointer containing the address of a next command ring entry to be processed; and a next unsolicited pointer containing the address of a next unsolicited ring entry to be processed.

8. The network adapter as in claim 2, wherein said adapter management subsystem includes a host notification means, responsive to said second means for notifying said adapter management subsystem when said host receive buffer is not available, for notifying said host computer system when said receive buffer is not available.

9. The network adapter as in claim 8, wherein said host notification means includes a means for writing an entry into an unsolicited ring in said host memory.

10. The network adapter as in claim 1, wherein said one or more adapter management command buffers includes an adapter manager command requesting adapter initialization.

11. The network adapter as in claim 1, wherein said one or more adapter management command buffers includes an adapter manager command requesting a diagnostic function.

12. The network adapter as in claim 1, wherein said one or more adapter management command buffers includes an adapter manager command requesting a network management function.

13. A network adapter coupled with a host computer and a high speed local area network, comprising:

a first data transfer circuit providing throughput equal to that of said high speed local area network, for transferring data packets directly between a memory in said host computer system and said high speed local area network; and a second data transfer circuit providing a lower throughput, for transferring data related to operations performed internally within said network adapter.

14. The network adapter as in claim 13, wherein said data related to operations performed internally within said network adapter includes an adapter manager command issued by said host computer requesting an initialization of said network adapter.

15. The network adapter as in claim 13, wherein said data related to operations performed within said network adapter includes an adapter management command issued by said host computer requesting a diagnostic function.

16. The network adapter as in claim 13, wherein said data related to operations performed within said network adapter includes an adapter management command issued by said host computer requesting a network management function.

17. The network adapter as in claim 16, further comprising:

an adapter management subsystem for performing said operations performed within said network adapter, and for generating a first response to said adapter management command issued by said host computer requesting a network management function, and for generating a second response to said adapter manager command requesting a diagnostic function, and for initializing said network adapter in response to said command requesting initialization of said network adapter; and wherein said data related to operations performed within said network adapter includes said first response and said second response generated by said adapter management subsystem.

18. A system for passing data between a high speed local area network and a host computer comprising:

a network adapter, coupled with said host computer system and said high speed local area network, said network adapter including a packet memory for storing packets received from said high speed local area network and an adapter management subsystem for generating responses to adapter manager commands received from said host computer system;

a host memory, having a transmit ring containing transmit ring entries indicating transmit buffers, said transmit buffers containing packets to be transmitted onto said high speed local area network, said host memory further containing a receive ring containing receive ring entries indicating receive buffers, said receive buffers for storing data received from said high speed local area network, said host memory also containing a command ring containing command ring entries indicating command buffers, said command buffers containing adapter manager commands for said network adapter, said host memory also containing an unsolicited ring containing unsolicited ring entries, said unsolicited ring entries containing unsolicited information generated by said network adapter;

a high throughput data transfer circuit for transferring said transmit buffers from said host memory into said packet memory in said network adapter, and for transferring a packet received from said high speed local area network by said network adapter from said packet memory in said network adapter into one of said receive buffers in said host memory; and a low throughput data transfer circuit for transferring said adapter manager commands from said host memory to said adapter management subsystem within said network adapter, and for transferring said responses to adapter manager commands received from said host computer system from said adapter management subsystem into said unsolicited ring entries in said host memory.

* * * * *